United States Patent [19]

Jephcott

[11] Patent Number: 4,660,853

[45] Date of Patent: Apr. 28, 1987

[54] VEHICLE BODY TILTING MECHANISM

[76] Inventor: Edmund F. N. Jephcott, Fern Hill, Fairwarp, Uckfield, Sussex TN 22 3BU, United Kingdom

[21] Appl. No.: 795,492

[22] PCT Filed: Feb. 12, 1984

[86] PCT No.: PCT/GB84/00051

§ 371 Date: Dec. 12, 1985

§ 102(e) Date: Dec. 12, 1985

[87] PCT Pub. No.: WO85/03678

PCT Pub. Date: Aug. 29, 1985

[51] Int. Cl.⁴ .................. B62D 9/02; B60G 17/00
[52] U.S. Cl. .................. 280/772; 280/6 R; 280/707
[58] Field of Search ........... 280/703, 707, 772, 6 R

[56]  References Cited

U.S. PATENT DOCUMENTS

| 3,285,623 | 11/1966 | Winsen | 280/112 R |
| 4,333,668 | 6/1982 | Hendrickson et al. | 280/703 |
| 4,357,033 | 11/1982 | Lee | 280/703 |
| 4,487,429 | 12/1984 | Ruggles | 280/772 |
| 4,573,702 | 3/1986 | Klem | 280/703 |

FOREIGN PATENT DOCUMENTS

| 0001009 | 3/1979 | European Pat. Off. . |
| 0020835 | 7/1981 | European Pat. Off. . |
| 828405 | 5/1938 | France . |
| 1143882 | 10/1957 | France . |
| WO84/03074 | 8/1984 | PCT Int'l Appl. . |
| 899003 | 6/1962 | United Kingdom . |
| 927745 | 6/1963 | United Kingdom . |
| 1334971 | 10/1973 | United Kingdom . |
| 1526970 | 10/1978 | United Kingdom . |
| 2068308 | 8/1981 | United Kingdom . |
| 2128142 | 4/1984 | United Kingdom . |

Primary Examiner—John J. Love
Assistant Examiner—Kenneth R. Rice
Attorney, Agent, or Firm—Barnes & Thornburg

[57]  ABSTRACT

A vehicle body tilting system responsive both to lateral acceleration of the vehicle and to steering movements. The mechanism includes tilt actuator means and tilt control means governed by a gravity-sensitive device and a device responsive to steering movement. The system maintains the vehicle body substantially in line with the resultant vector of gravity and centripetal acceleration while cornering. The steering input accelerates the response of the mechanism to changes of direction of the vehicle.

5 Claims, 2 Drawing Figures

4,660,853

VEHICLE BODY TILTING MECHANISM

BACKGROUND OF THE INVENTION

The invention relates to vehicle body tilting systems of the kind which includes tilt actuator means for controlling the direction and magnitude of tilt of the vehicle body during vehicle cornering and tilt control valve means responsive to centripetal acceleration of the vehicle operatively connected to the actuator means, the tilt actuator means and tilt control valve means being operative to tilt the vehicle body so that the vehicle body remains substantially in line with the resultant vector of gravity and the centripetal acceleration.

THE PRIOR ART

A vehicle body tilting system of the kind described above is described in EP No. 0 020 835 A. From experience with other systems relating to vehicle suspensions it is thought that the response of hydraulic control valves may be inadequate in certain vehicle manoevres. It is an object of the present invention to provide a vehicle body tilting system of the kind described which is responsive to steering movements which cause changes in centripetal acceleration.

OBJECT OF THE INVENTION

STATEMENT OF THE INVENTION

According to the present invention, in a vehicle body tilting system of the kind referred to the tilt control valve means is also operatively connected to the steering mechanism of the vehicle such that the tilt actuator means gives a response to a change in steering angle in the same sense as the response due to the change in centripetal acceleration resulting from the change in steering angle.

BRIEF DESCRIPTION OF THE DRAWINGS

In the accompanying drawings the

DESCRIPTION OF PREFERRED EMBODIMENT

Figure 1:
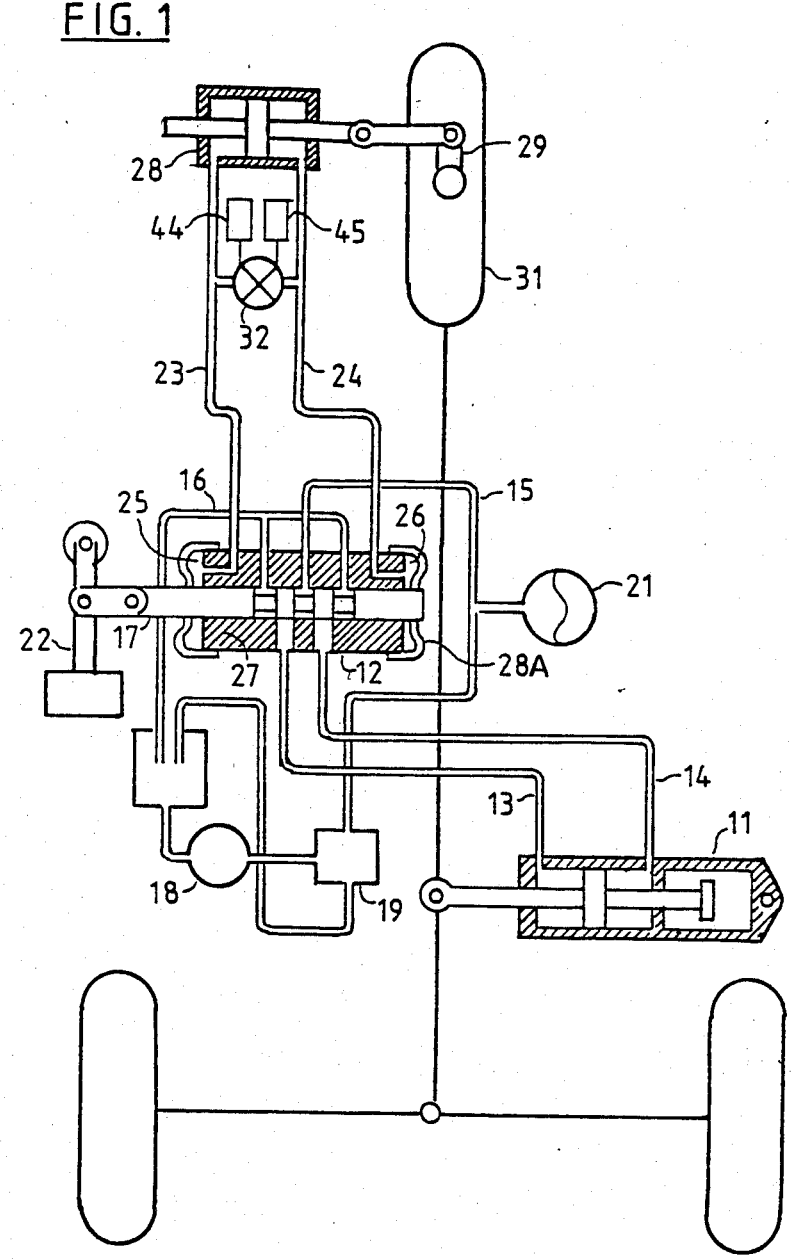
FIG. 1 is a diagrammatic view of a hydraulically operable vehicle body tilting system, and; the FIG. 2 is a diagrammatic view of an electronic arrangement for a vehicle body tilting system in accordance with the features of the invention.

The invention will now be described by way of example with reference to the accompanying drawing (FIG. 1) which is a diagrammatic view of a vehicle body tilting system according to the invention.

In the drawing there is shown tilt actuator means in the form of a double-acting hydraulic ram 11 which acts between a chassis frame and a body frame of a three wheeled vehicle as described in EP No. 0 020 835 A. The ram 11 is operatively connected to a spool-type control valve 12 by hydraulic lines 13 and 14 which are selectively connected to a pressure line 15 or a return line 16 according to the position of the valve spool 17. Hydraulic pressure is supplied to line 15 by a conventional pump 18, cut-out regulator valve 19 and accumulator 21.

A pendulum 22 is connected to the valve spool 17 through a spring-box (not shown), the arrangement being such that when the pendulum 22 hangs freely and the vehicle is on a flat level ground, the actuator 11 supports the vehicle body upright and the valve spool 17 is in the lap position. During cornering of the vehicle the pendulum 22 and spool valve 12 act as tilt control valve means operative to tilt the vehicle body so that the normally upright axis of the vehicle body remains substantially in line with the resultant vector of gravity and the centrifugal force acting on the vehicle. This means that under steady state cornering conditions, the pendulum 22 remains in the normal position relative to the vehicle body and the occupants of the vehicle experience no lateral forces. When the pendulum moves from the position shown in the drawing, hydraulic pressure in lines 13 and 14 increases or decreases to restore the valve spool 17 to the lap position.

The spool valve 12 is also operatively connected to the steering mechanism of the vehicle by hydraulic lines 23 and 24 which are connected to chambers 25 and 26 respectively. These chambers 25 and 26 are formed by the end faces of the housing 27 of the spool valve 12 and by flexible diaphragms 28 which are secured to the spool valve housing 27. The diaphragms 28 and valve body 27 function as slave cylinder devices which respond to hydraulic pressure developed by a double acting master cylinder device 28A which is directly coupled to a steering arm 29 connected to the steering mechanism of a single front wheel 31. A bleed restrictor 32 interconnects lines 23 and 24 so that hydraulic fluid can transfer to a different pressure. Thus the master and slave cylinder devices form a dashpot device and the spool valve 12 is responsive to the rate of movement of the steering mechanism.

In operation, if the steering is turned for a right-hand corner (clockwise cornering), pressure is generated in line 23 and chamber 28, thus moving the valve spool 17 to the left of the drawing. This increases the pressure in line 14 (which is connected by the spool 17 to line 15) and decreases the pressure in line 14 (which is connected by the spool 17 to line 16). This shortens the ram 11 which causes the vehicle body to tilt inwards in the direction of the corner. The connection of the vehicle steering mechanism to the spool control valve 12 causes movement of the valve spool 17 so that tilting can begin before the pendulum 22 moves as a result of a substantial centripetal acceleration.

The system described above can be modified without departing from the broad scope of the invention. For example, pistons or the spool end faces can replace the diaphragms 28 and the system can be used in four-wheeled vehicles as described in EP No. 0 020 835 A.

Figure 2:
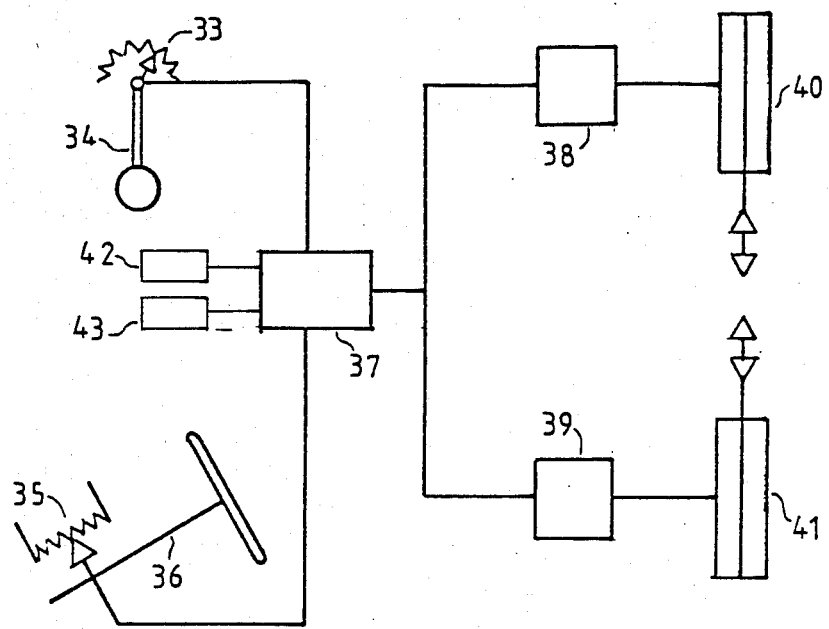

The system described above can also be modified without departing from the broad principles of the invention by replacing hydraulic means by electrical and electronic means. A schematic layout of this variant is shown in FIG. 2. Centripetal acceleration is measured electronically by a sensor such as a potentiometer 33 actuated by a pendulum 34 and steering movement is measured electronically by a sensor such as an accelerometer 35 attached to the steering mechanism 36. The signals from the pendulum and steering are co-ordinated by an electronic microprocessor operative as a signal comparator 37 and transmitted via an amplifier or amplifiers 38, 39 to means such as an electromechanical linear actuator or actuators 40, 41 mounted between the body and chassis sections of the vehicle and powered by a source such as the vehicle battery. The signal comparator co-ordinates the signals from steering and pendulum in such a way that the steering response initiates tilt and the pendulum response controls the degree of tilt while cornering, the programme controlling the processor being so designed as initially to prioritise the signal from the steering, and then progressively to prioritise the signal produced by lateral acceleration, the exact rateof transition being determined partly experimentally in relation to the road behaviour of the vehicle.

The mechanism described so far may be supplemented by inputs from devices responsive to the road speed or the rate of deceleration of the vehicle, or both.

In the hydraulic version a device 44 of known kind for measuring road speed such as a speedometer mechanism may be connected to the bleed restrictor 32 in such a way that the size of the bleed orifice is reduced as road speed rises. In the electronic version a sensor 42 measuring road speed feeds a signal to the processor which increases the prioritisation of the steering signal as speed rises.

Similarly, in the hydraulic version, a device 45 of known kind such as a 'deceleration valve' used in braking systems, for example a weight free to move in the longitudinal axis of the vehicle against a gradient or spring and actuating a needle valve, is incorporated in the bleed restrictor 32 in such a way that sharp deceleration of the vehicle causes a reduction in size of the bleed orifice and so increased response of the tilt mechanism to steering movements, as may be required in sudden emergency swerves while braking. In the electronic version a sensor 43 responsive to vehicle deceleration feeds a signal to the processor which increases the prioritisation of the steering signal.

It is understood that the scope of the invention includes combinations of features from the hydraulic and electronic versions described above, for example a system in which electronic sensors and processor control hydraulic tilt control means, for example through a solenoid-operated hydraulic control valve.

It is also understood that 'vehicle body' as used in the foregoing and in the following claims may include part of the chassis supporting the body and at least one of the road wheels.

I claim:

1. A vehicle steering system for a vehicle having a tiltable body with a normally upright axis and a vehicle steering mechanism, the system including tilt actuator means for controlling the direction and magnitude of the vehicle body tilt during vehicle cornering;

tilt control means responsive to centripetal acceleration of the vehicle; means operatively connecting the tilt control means to the actuator means whereby the tilt actuator means and the tilt control means are operative to tilt the vehicle body so that the normally upright axis of the vehicle body remains substantially in line with the resultant vector of gravity and the centrifugal force;

electronic means operatively connecting the tilt control means to the steering mechanism of the vehicle including means for providing that the tilt actuator means gives a response to a change in the steering angle in the same sense as the response due to the change in the centripetal acceleration resulting from the change in the steering angle.

2. A vehicle body steering system as claimed in claim 1, and in which the tilt control means includes means responsive to the rate of movement of the steering mechanism.

3. A vehicle body steering system as claimed in claim 2, and including means for increasing the response of the steering mechanism to steering movements with increased road speed of the vehicle.

4. A vehicle body tilting system according to claim 2, and in which the electronic means incorporates acceleration and deceleration sensors and a processor.

5. A vehicle body tilting system according to claim 2, and including means for increasing the response of the steering mechanism to steering movements is increased with increasing deceleration of the vehicle.

* * * * *

UNITED STATES PATENT AND TRADEMARK OFFICE
CERTIFICATE OF CORRECTION

PATENT NO.   : 4,660,853
DATED        : April 28, 1987
INVENTOR(S)  : Jephcott

It is certified that error appears in the above-identified patent and that said Letters Patent is hereby corrected as shown below:

On cover page, in line "[22]", replace "Feb. 12, 1984" with --Feb. 21, 1984--.

In Col. 3, line 3, replace "rateof" with --rate of--.

In Col. 4, line 37, delete "is increased".

Signed and Sealed this

Twenty-ninth Day of September, 1987

*Attest:*

DONALD J. QUIGG

*Attesting Officer*   *Commissioner of Patents and Trademarks*